(12) United States Patent
Proell et al.

(10) Patent No.: US 11,214,283 B2
(45) Date of Patent: Jan. 4, 2022

(54) TANK SYSTEM AND VEHICLE

(71) Applicant: SIEMENS MOBILITY GMBH, Munich (DE)

(72) Inventors: Guenther Proell, Augsburg (DE); Christian Nitzsche, Ismaning (DE); Stephan Schanz, Unterschleissheim (DE)

(73) Assignee: Siemens Mobility GmbH, Munich (DE)

( * ) Notice: Subject to any disclaimer, the term of this patent is extended or adjusted under 35 U.S.C. 154(b) by 650 days.

(21) Appl. No.: 16/089,445

(22) PCT Filed: Feb. 9, 2017

(86) PCT No.: PCT/EP2017/052840
§ 371 (c)(1),
(2) Date: Sep. 28, 2018

(87) PCT Pub. No.: WO2017/167481
PCT Pub. Date: Oct. 5, 2017

(65) Prior Publication Data
US 2019/0118836 A1    Apr. 25, 2019

(30) Foreign Application Priority Data

Mar. 31, 2016   (DE) .................... 10 2016 205 356.6

(51) Int. Cl.
*B61C 17/02*    (2006.01)
*F01N 3/20*    (2006.01)
(Continued)

(52) U.S. Cl.
CPC .............. *B61C 17/02* (2013.01); *B60K 13/04* (2013.01); *F01N 3/021* (2013.01); *F01N 3/0205* (2013.01);
(Continued)

(58) Field of Classification Search
CPC ...... F01N 3/2896; F01N 3/2066; F01N 3/021; F01N 3/025; B61C 17/02; B60K 13/04; B60R 16/08; B62D 33/00
See application file for complete search history.

(56) References Cited

U.S. PATENT DOCUMENTS

| | | |
|---|---|---|
| 4,469,190 A | 9/1984 | Yamaguchi |
| 6,607,005 B2 | 8/2003 | Viebahn et al. |

(Continued)

FOREIGN PATENT DOCUMENTS

| | | |
|---|---|---|
| CN | 104254470 A | 12/2014 |
| CN | 104386374 A | 3/2015 |

(Continued)

*Primary Examiner* — Scott A Browne
(74) *Attorney, Agent, or Firm* — Laurence A. Greenberg; Werner H. Stemer; Ralph E. Locher

(57) ABSTRACT

A tank system includes an extraction device and a tank. The extraction device has an extraction line and an attachment device. The tank includes a tank top side having a fastening wall and a first tank top side section. The fastening wall and the first tank top side section delimit a tank interior space at the top side. The tank interior space can be filled with an exhaust-gas after-treatment liquid, the fastening wall is disposed obliquely to the first tank top side section, the fastening wall has a fastening surface and a tank opening, the attachment device is fastened to the fastening surface, and the extraction line is guided through the tank opening. A vehicle having the tank system is also provided.

19 Claims, 10 Drawing Sheets

(51) Int. Cl.
  *B60K 13/04*   (2006.01)
  *F01N 3/02*   (2006.01)
  *F01N 3/021*   (2006.01)

(52) U.S. Cl.
  CPC ........ *F01N 3/2066* (2013.01); *F01N 2590/08* (2013.01); *F01N 2610/02* (2013.01); *F01N 2610/10* (2013.01); *F01N 2610/1406* (2013.01); *F01N 2610/1426* (2013.01); *Y02A 50/20* (2018.01); *Y02T 10/12* (2013.01)

(56) References Cited

U.S. PATENT DOCUMENTS

| | | |
|---|---|---|
| 8,495,960 B2 | 7/2013 | Willbrandt et al. |
| 9,388,725 B2 | 7/2016 | Ogawa et al. |
| 9,732,653 B2 | 8/2017 | Ogawa et al. |
| 2007/0202019 A1 | 8/2007 | Nishina et al. |
| 2009/0188923 A1* | 7/2009 | Versaw, Jr. ........ F02M 37/0082 220/564 |
| 2010/0162690 A1 | 7/2010 | Hosaka et al. |
| 2013/0245863 A1 | 9/2013 | Frazier et al. |
| 2014/0150686 A1 | 6/2014 | Swenson |

FOREIGN PATENT DOCUMENTS

| | | | |
|---|---|---|---|
| CN | 105366230 A | 3/2016 | |
| DE | 102007051922 A1 * | 4/2009 | ........... F01N 3/2066 |
| DE | 102007051922 A1 | 4/2009 | |
| DE | 102008011329 A1 | 9/2009 | |
| DE | 102013004906 A1 | 9/2014 | |
| DE | 112014000013 T5 | 6/2015 | |
| DE | 112014000015 T5 | 6/2015 | |
| EP | 2757232 A1 | 7/2014 | |
| RU | 80443 U1 | 2/2009 | |
| RU | 138267 U1 | 3/2014 | |
| SU | 1092106 A1 | 5/1984 | |
| WO | 2011078235 A1 | 6/2011 | |

* cited by examiner

TANK SYSTEM AND VEHICLE

BACKGROUND OF THE INVENTION

Field of the Invention

The invention relates to a tank system for a vehicle, including an extraction device and a tank, wherein the extraction device includes an extraction line and an attachment device, the tank includes a tank top side, the tank top side includes a fastening wall and a first tank top side section, the fastening wall and the first tank top side section delimit a tank interior space at a top side, the tank interior space can be filled with an exhaust-gas aftertreatment liquid, the fastening wall is disposed obliquely with respect to the first tank top side section, the fastening wall has a fastening surface and a tank opening, the attachment device is fastened to the fastening surface, the extraction line is led through the tank opening, the tank includes a tank base having a first tank base section and a second tank base section, the second tank base section is disposed at a lower level than the first tank base section and is connected to the first tank base section, the second tank base section is disposed parallel to the first tank top side section, the first tank base section is disposed obliquely with respect to the second tank base section, and the extraction line is, at least in sections, disposed obliquely with respect to the second tank base section. The invention also relates to a diesel-electric rail vehicle having the tank system.

A diesel-electric locomotive is known, wherein the diesel-electric locomotive comprises a drive unit with a diesel engine and with a generator. The diesel engine drives the generator. To reduce emissions of the diesel engine, an exhaust-gas aftertreatment system is provided. Here, the exhaust-gas aftertreatment system uses an aqueous urea solution to reduce nitrogen oxides in the exhaust gas of the diesel engine. The aqueous urea solution is stored by means of a tank system. The aqueous urea solution is extracted by means of an extraction device and conveyed to the exhaust-gas aftertreatment system. The aqueous urea solution often has contaminants which are deposited in a tank of the tank system. The tank must be regularly cleaned in order to remove the contaminants.

For example, DE 10 2008 011 329 A1 presents a rail vehicle with an exhaust-gas purification arrangement, wherein the urea solution is used for the exhaust-gas purification arrangement.

Furthermore, DE 10 2008 011 329 A1, US 2010/0162690 A1 and US 2007/0202019 A1 present urea tanks with a small storage volume.

EP 2 757 232 A1 has disclosed an off-road vehicle with an exhaust-gas purification tank and with an extraction device, wherein a fastening surface to which the extraction device is fastened is arranged obliquely with respect to a tank top side section of a tank top side of the tank. The extraction device is fastened to the fastening wall.

SUMMARY OF THE INVENTION

It is an object of the invention to provide an improved tank system and an improved vehicle, in particular an improved rail vehicle which is operated on a diesel-electric basis.

Said object is achieved by means of a tank system for a vehicle, wherein the extraction line opens out above the second tank base section of the tank base and is coupled to the attachment device, and the fastening wall is disposed preferably entirely above the first tank base section. The object is also achieved by a diesel-electric rail vehicle including the tank section. Advantageous embodiments are specified in the dependent claims.

It has been identified that an improved tank system can be provided by virtue of the tank system comprising an extraction device and a tank, wherein the extraction device comprises an extraction line and an attachment device, wherein the tank comprises a tank top side, wherein the tank top side comprises a fastening wall and a first tank top side section, wherein the delimiting wall and the first tank top side section delimit a tank interior space at a top side, wherein the tank interior space can be filled with an exhaust-gas aftertreatment liquid, wherein the fastening wall is arranged obliquely with respect to the first tank top side section, wherein the fastening wall has a fastening surface and a tank opening, wherein the attachment device is fastened to the fastening surface, wherein the extraction line is led through the tank opening.

This embodiment has the advantage that the extraction device can be particularly easily removed from the tank for maintenance work. Also, the installation of the extraction device on the tank is particularly straightforward. In particular, uninstallation and installation of the tank and emptying of the tank for the maintenance work can be omitted.

In a further embodiment, the tank comprises a tank base, a first tank base section and a second tank base section, wherein the second tank base section is arranged at a lower level than the first tank base section and is connected to the first tank base section, wherein the second tank base section is arranged parallel to the first tank top side section, wherein the first tank base section is arranged obliquely with respect to the second tank base section, wherein the extraction line opens out above the second tank base section of the tank base and is coupled to the attachment device, wherein the extraction line is, at least in sections, arranged obliquely with respect to the second tank base section.

In a further embodiment, the tank comprises a tank side wall, wherein the fastening wall is arranged so as to be obliquely inclined relative to the tank side wall. Additionally or alternatively, the tank side wall is arranged perpendicular to the first tank top side section.

In a further embodiment, the tank side wall is connected by means of a lower end to a first end of the first tank base section, wherein a second end of the first tank base section is connected to the second tank base section, wherein the second tank base section is arranged below the lower end of the tank side wall and laterally offset with respect to the tank side wall, wherein the fastening wall is arranged above the first tank base section.

In a further embodiment, the fastening wall projects at least in sections beyond the tank side wall, wherein, at least in sections, the tank side wall delimits a storage volume of the tank and the fastening wall delimits an expansion volume for the exhaust-gas aftertreatment liquid. The expansion volume must be provided in order to permit, in the presence of high temperatures of the exhaust-gas aftertreatment liquid, an expansion of the exhaust-gas aftertreatment liquid out of the storage volume into the expansion volume in order to prevent mechanical damage to the tank.

In a further embodiment, a depression is provided on the tank top side between the fastening wall and the tank side wall, wherein the depression has the same longitudinal extent as the fastening wall.

In a further embodiment, the fastening wall, at the top side, projects at least in sections beyond the first tank top side section, wherein, at an upper end, the fastening wall is connected to an upper end of the second tank top side section of the tank top side, wherein a lower end of the second tank top side section is connected to the first tank top side section, wherein the second tank top side section and the fastening wall are adjoined by a front delimiting wall and a rear-side delimiting wall, wherein the front delimiting wall and the rear-side delimiting wall are oriented parallel to one another, wherein the front delimiting wall and the rear-side delimiting wall are arranged perpendicular to the first tank top side section.

In a further embodiment, the extraction device comprises a filter device, wherein the extraction line is designed to conduct the exhaust-gas aftertreatment liquid, wherein the extraction line comprises an extraction section and a first connecting section, wherein the first connecting section is coupled to the attachment device, wherein the extraction section is coupled to the first connecting section, wherein the first connecting section is arranged so as to be obliquely inclined with respect to the extraction section, wherein the extraction section is oriented perpendicular to the first tank top side section, wherein the filter device is connected to the extraction section on a side of the extraction section averted from the first connecting section, wherein the first connecting section is arranged so as to run in a first plane, wherein the extraction section is arranged so as to run in a second plane, wherein the first plane is arranged obliquely with respect to the second plane and encloses a first angle, wherein the first angle has a value, wherein the value preferably lies in a range of less than 90° and greater than 0°, wherein, in particular, the value lies in a range of greater than 0° to 45°, wherein, in particular, the value lies in a range from 15° to 30°. In this way, dirt particles from the tank are prevented from being drawn in through the extraction device.

In a further embodiment, the extraction line comprises a second connecting section, wherein the second connecting section is arranged between the first connecting section and the extraction section and connects the extraction section to the first connecting section, wherein the second connecting section is arranged so as to be obliquely inclined with respect to the extraction section and obliquely inclined with respect to the first connecting section.

In a further embodiment, the tank system has a heat exchanger device with a first heat exchanger element and a second heat exchanger element, wherein the heat exchanger device can be filled with a heat carrier medium, wherein the first heat exchanger element is arranged offset with respect to the second heat exchanger element, wherein each of the heat exchanger elements comprises a first connecting line, a second connecting line and a heating tube, wherein the second connecting line of the first heat exchanger element is connected by means of a third connecting line to the second connecting line of the second heat exchanger element, wherein, between the first heat exchanger element and the second heat exchanger element, the heat exchanger device delimits a protected region, wherein the extraction line is arranged in the protected region. In this way, a particularly reliable extraction from the tank can be ensured. Furthermore, the extraction device is of particularly compact form in the region of the extraction section. Furthermore, damage to the extraction line and/or to the filter device during installation or uninstallation of the extraction device on or from the tank is avoided.

In a further embodiment, the first connecting line is coupled to the attachment device, wherein the first connecting line and the second connecting line are arranged parallel to one another, wherein the first connecting line and the second connecting line are, at least in sections, arranged parallel to the first connecting section of the extraction line, wherein the first connecting line is arranged in a third plane and the first heating tube section is arranged in a fourth plane, wherein the third plane encloses a second angle with the fourth plane, wherein the second angle has a value which lies in a range of greater than 90° and less than 180°, wherein the heating tube comprises at least one first heating tube section, wherein the first heating tube section is connected to the first connecting line, wherein the first heating tube section is arranged perpendicular to the extraction section. In this way, the extraction device can be of particularly compact form.

In a further embodiment, the heating tube comprises a second heating tube section and a heating tube connecting section, wherein the second connecting line is connected to the heating tube, wherein the second connecting line is, at least in sections, arranged parallel to the first connecting line, wherein the heating tube connecting section fluidically connects the first heating tube section to the second heating tube section and is arranged on a side of the first heating tube section which is averted from the first connecting line.

In a further embodiment, the filter device is arranged between the heating tube of the first heat exchanger element and the heating tube of the second heat exchanger element, wherein the filter device is preferably formed as an areal filter, wherein, preferably, multiple filter devices are provided, which are arranged in a row parallel to the heating tube.

In a further embodiment, a vehicle comprises a tank system, a longitudinal member and a vehicle side delimitation, wherein the tank system is designed as described above, wherein the tank is arranged under the longitudinal member, wherein the vehicle side delimitation and the longitudinal member are arranged offset transversely with respect to a direction of travel of the vehicle, wherein, transversely with respect to the direction of travel, the vehicle side delimitation and the longitudinal member delimit the extraction device for the installation and/or uninstallation, wherein, in a downward direction, the installation space is delimited by the tank top side of the tank, wherein the tank system comprises at least one pump device and one attachment line, wherein the pump device has a suction side and a pressure side, wherein the suction side is fluidically connected via the attachment line to the extraction device, wherein the pressure side is fluidically connectable to an exhaust-gas aftertreatment system of the vehicle, wherein the pump device and the attachment line are arranged in the installation space.

In a further embodiment, the attachment device is arranged so as to be obliquely inclined toward the vehicle side delimitation. In this way, particularly easy accessibility to the attachment device and for facilitated installation and uninstallation of a fastening means arranged on the attachment device is ensured. Alternatively or in addition, the tank extends at least over 80 percent of a total vehicle width of the vehicle. In this way, the storage volume of the tank can amount to between 750 l and 6000 l.

BRIEF DESCRIPTION OF THE SEVERAL VIEWS OF THE DRAWING

The above-described characteristics, features and advantages of this invention, and the manner in which these are achieved, will become clearer and more clearly understandable in conjunction with the following description of the exemplary embodiments, which will be discussed in more detail in conjunction with the drawings, wherein.

DESCRIPTION OF THE INVENTION

In the following FIGS. 1 to 10, reference is made to a coordinate system 5. The coordinate system 5 is configured as a right-handed system and comprises an x axis, a y axis and a z axis. The x axis (longitudinal direction) is in this case arranged so as to run parallel to the direction of travel of a vehicle 10. The y axis is arranged in a transverse direction with respect to the direction of travel. Here, the z axis corresponds to a vertical direction of the vehicle 10.

Figure 1:
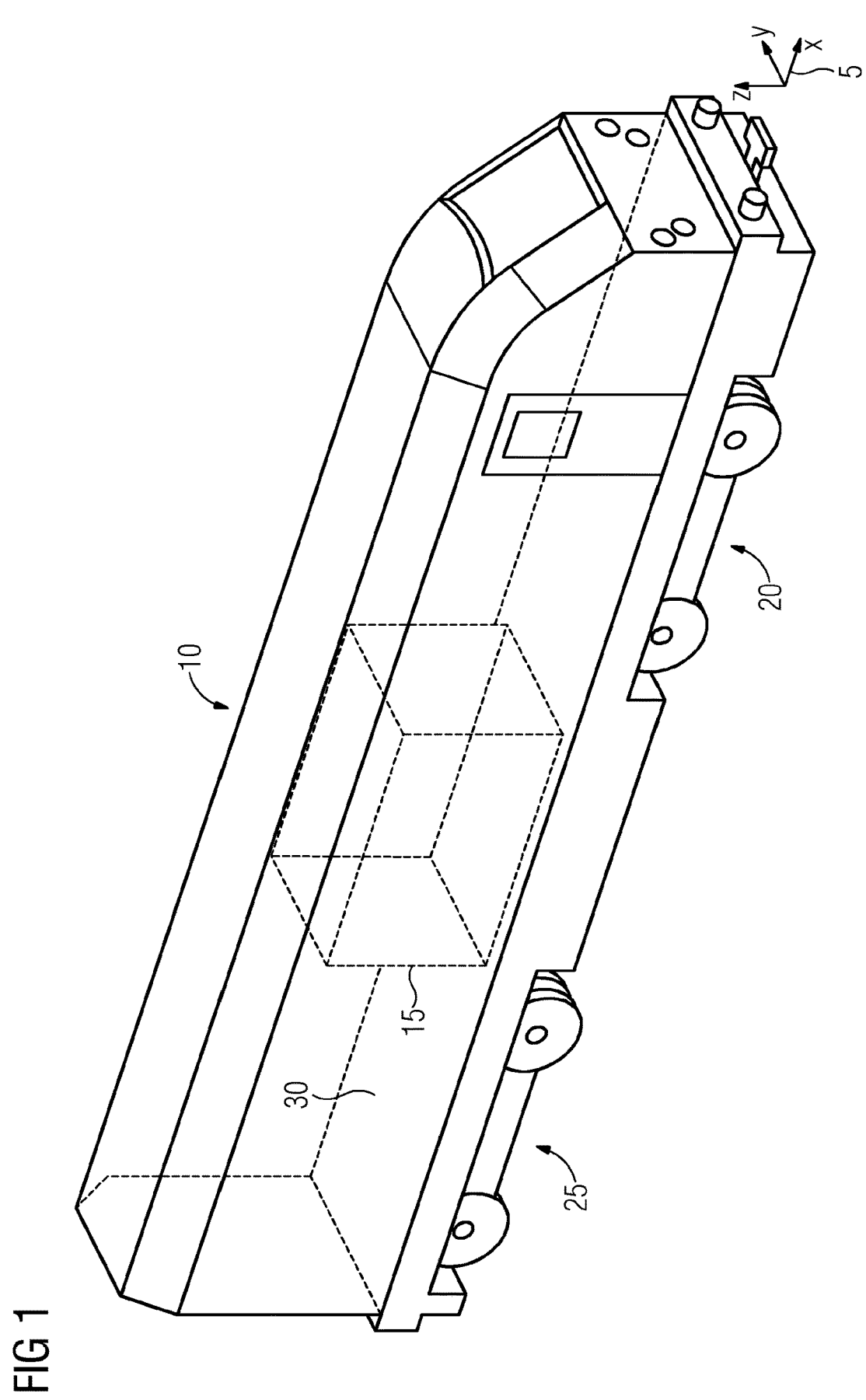
FIG. 1 is a perspective illustration of a vehicle.

FIG. 1 is a perspective illustration of a vehicle 10.

The vehicle 10 is designed for example as a rail-bound vehicle, in the embodiment for example as a locomotive. It is also conceivable for the vehicle 10 to also be designed as a rail motor coach or as a motor vehicle, in particular as a heavy goods vehicle.

The vehicle 10 comprises a drive unit 15, for example a first bogie 20, a second bogie 25 and a railcar body 30. The first bogie 20 is connected via the railcar body 30 to the second bogie 25 and to the drive unit 15. The railcar body 30 is in this case designed to exchange the mechanical forces between the bogies 20, 25 and the drive unit 15.

Figure 2:
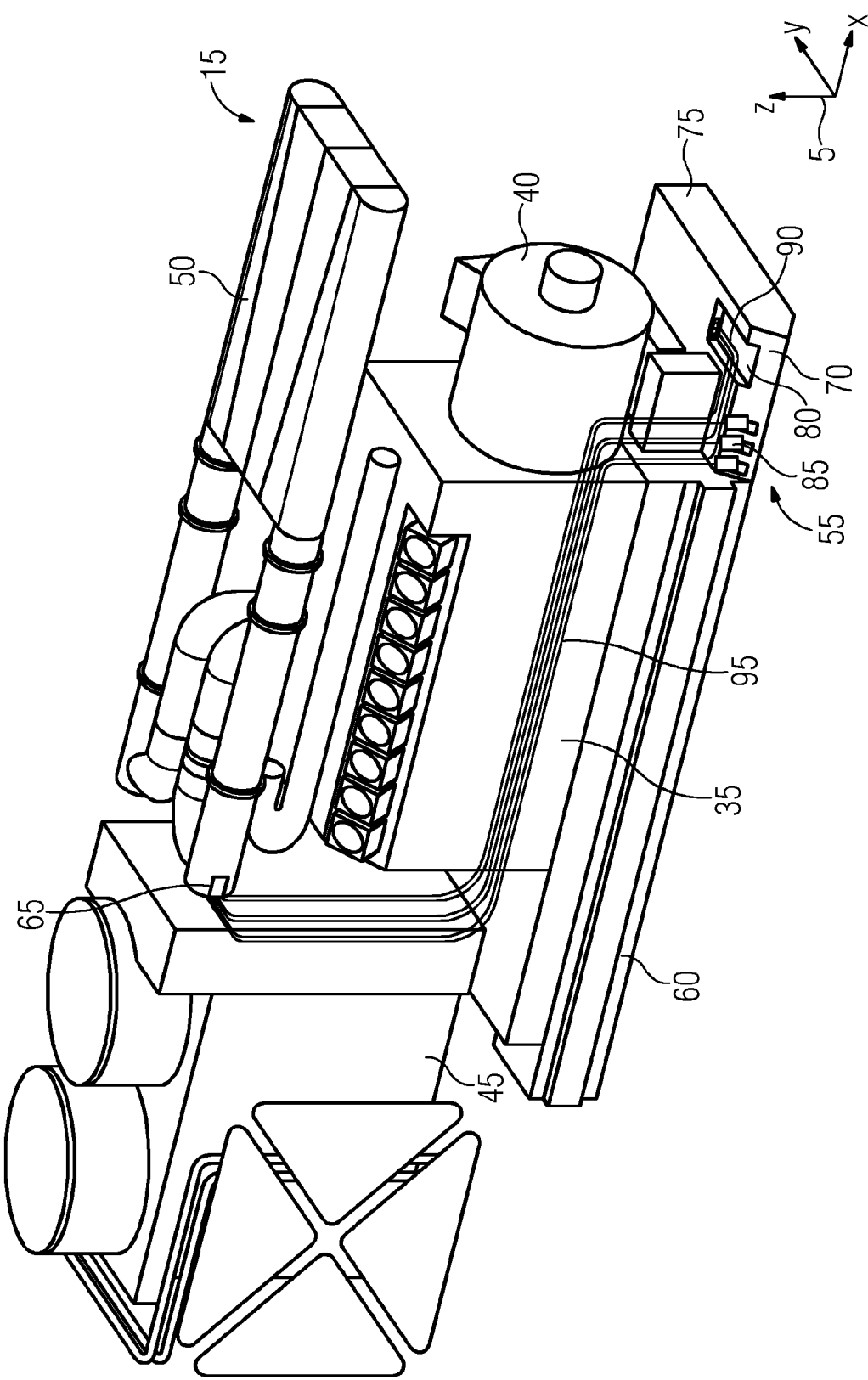
FIG. 2 is a perspective illustration of a drive of the vehicle shown in FIG. 1.

FIG. 2 shows a perspective view of the drive unit 15. The drive unit 15 comprises a drive engine 35, a generator 40, a cooling system 45, an exhaust-gas aftertreatment system 50, a tank system 55, and a fuel tank 60. In the embodiment, the drive engine 35 is designed for example as a diesel engine. The drive engine 35 may self-evidently be of some other design. The drive engine 35 is coupled, for transmission of torque, to the generator 40. During operation, the drive engine 35 draws in a fuel from the fuel tank 60 and burns the fuel by known methods. Here, the drive engine 35 outputs a torque, with which the generator 40 is operated in order to provide electrical energy for driving the vehicle 10. The exhaust gas generated during the combustion is purified by means of the exhaust-gas aftertreatment system 50. The waste heat that is also generated during the combustion is dissipated from the drive engine 35 by means of the cooling system 45 in order to prevent overheating of the drive engine 35.

In the embodiment, by way of example, the exhaust-gas aftertreatment system 50 is arranged above the drive engine 35 and the generator 40. The fuel tank 60 is arranged below the drive engine 35. The tank system 55 is arranged below the generator 40. The cooling system 45 is arranged behind the drive motor 35 in relation to a direction of travel, on a side averted from the generator 40. The components 35, 40, 45, 50, 55, 60 of the drive unit 15 may also be arranged relative to one another in some other way.

The exhaust-gas aftertreatment system 50 comprises a catalytic converter, preferably an SCR catalytic converter (not illustrated), and at least one injection nozzle 65.

The tank system 55 comprises a tank 70 for storing an exhaust-gas aftertreatment liquid 75 for the exhaust-gas aftertreatment system 50. In the embodiment, the exhaust-gas aftertreatment liquid 75 has for example an aqueous urea solution, preferably with a urea fraction of approximately 32.5%. The tank system 55 furthermore comprises at least one pump device 85, at least one attachment line 90 and at least one conveying line 95.

The pump device 85 has, by way of example, at least one pump 135. Each pump 135 has a suction side and a pressure side. In the embodiment, by way of example, in each case one pump 135 is provided for each injection nozzle 65. The pressure side of the pump 135 is connected in each case via a separate conveying line 95 to the injection nozzle 65 assigned to the pump 135. Likewise, by way of example, in each case one attachment line 90 is provided for each pump 135. The attachment line 90 is furthermore connected to the extraction device 80. Some other number of injection nozzles 65 and/or pumps 135 may also be selected.

During the operation of the pump 135, the pump 135 draws in the exhaust-gas aftertreatment liquid 75 from the tank 70. The pump 135 conveys the exhaust-gas aftertreatment liquid 75 via the conveying line 95 to the injection nozzle 65. The injection nozzle 65 injects the exhaust-gas aftertreatment liquid 75 into the catalytic converter.

Figure 3:
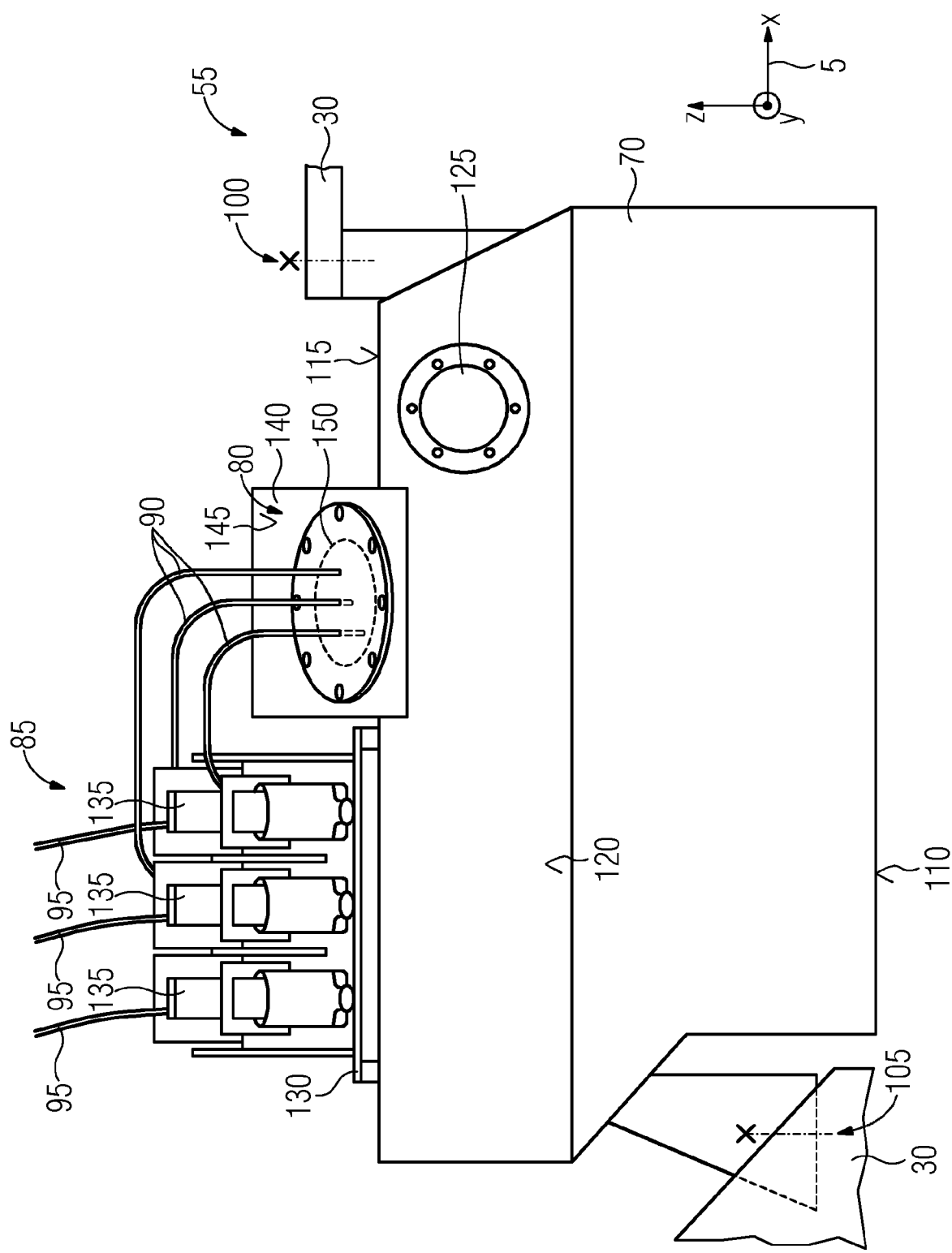
FIG. 3 shows a detail of a side view of the vehicle shown in FIG. 1.

FIG. 3 shows a side view of the tank system 55. The tank system 55 is connected, at the front in a direction of travel, for example by a first fastening means 100, to the railcar body 30. Furthermore, the tank 70 is connected, at the rear in a direction of travel, by a second fastening means 105 to the railcar body 30.

The tank 70 has, at an underside, a tank base 110 and, at a top side, a tank top side 115. At the sides, the tank 70 is delimited by a tank side wall 120. In the embodiment, the tank side wall 120 is arranged by way of example in an xz plane. On the tank side wall 120, the tank 70 has a filling opening 125. On the tank top side 115 there is provided a holder 130 which fastens the pump device 85 to the tank 70. The pump 135 is fastened, adjacent to one another in a direction of travel, to the holder 130.

The tank top side 115 has a fastening wall 140. The fastening wall 140 is arranged obliquely with respect to the tank side wall 120. The fastening wall 140 has a fastening surface 145 and a tank opening 150. The fastening wall 140 projects upward beyond the tank top side 115. Here, in a direction of travel (x axis), the fastening wall 140 is arranged between the pump device 85 and the filling opening 125. Other arrangement positions for the fastening wall 140 are self-evidently also conceivable. Here, the fastening wall 140 is inclined laterally outward.

Figure 4:
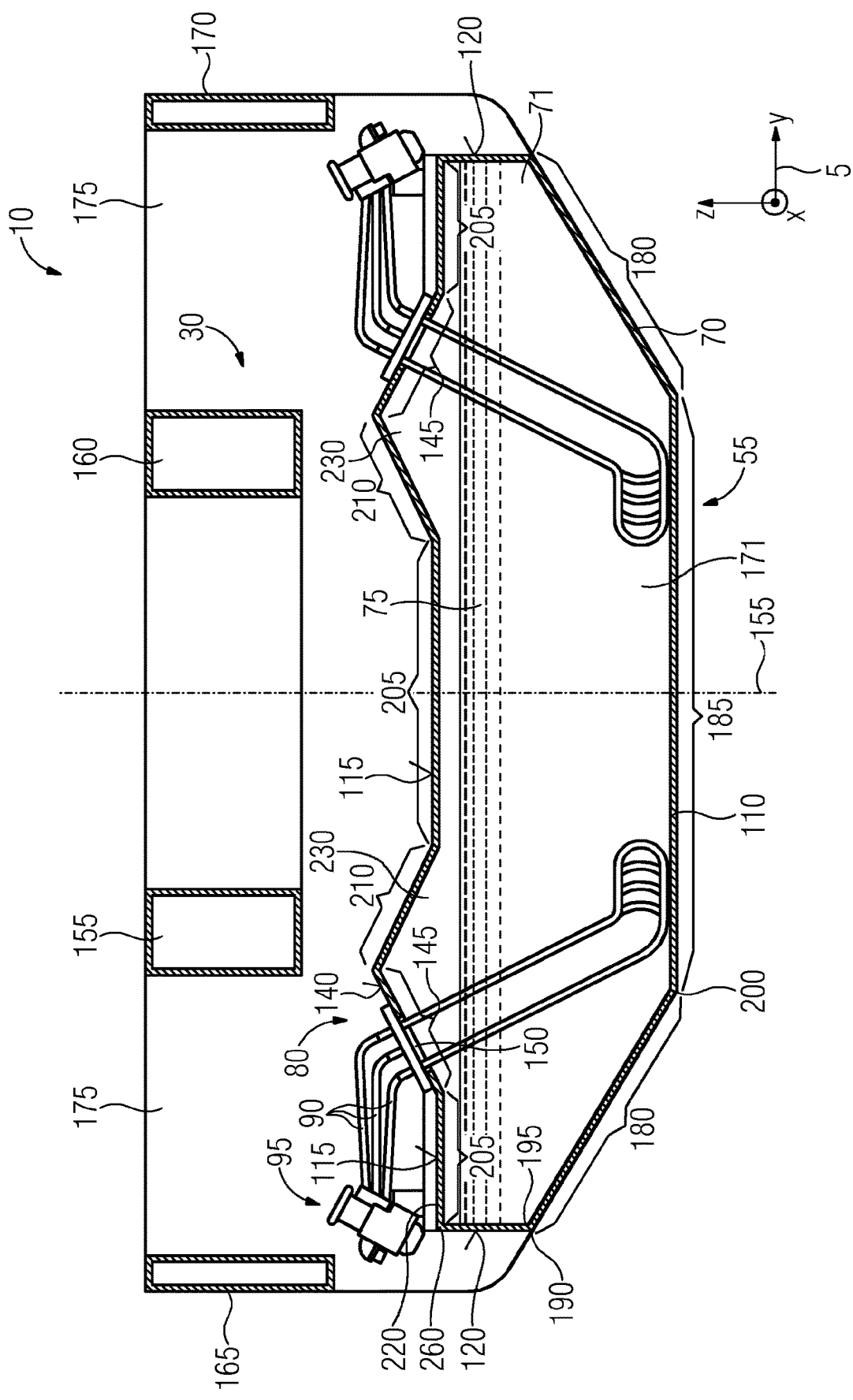
FIG. 4 shows a detail of a sectional view through the vehicle along a section plane A-A shown in FIG. 1.

FIG. 4 shows a sectional view through the vehicle 10 along a section plane A-A shown in FIG. 1. In the embodiment, the tank system 55 is designed to be symmetrical with respect to a plane of symmetry 151 which is arranged in an xz plane and which preferably runs in the vehicle center.

The railcar body 30 has a first longitudinal member 155 and a second longitudinal member 160 which is arranged offset with respect to the first longitudinal member 155 in a transverse direction. The longitudinal member 155, 160 is preferably designed as a central longitudinal member. Here, the longitudinal member 155, 160 runs parallel to the x axis, wherein, in the y direction, the first longitudinal member 155 and the second longitudinal member 160 are preferably arranged with the same spacing to the vehicle center. The vehicle 10 furthermore comprises a first vehicle side delimitation 165 and a second vehicle side delimitation 170. The vehicle side delimitations 165, 170 are arranged opposite one another in a transverse direction (y direction).

The tank system 55 is arranged below the longitudinal member 155, 160. Here, the tank 70 extends substantially over a major part, preferably over at least 80 percent, of a total vehicle width of the vehicle 10. The tank 70, in its tank interior space 71, delimits a storage volume 171 for storing the exhaust-gas aftertreatment liquid 75, and an expansion volume 230. The expansion volume 230 is arranged above the storage volume 171.

The longitudinal member 155, 160, together with the vehicle side delimitation 165, 170, delimits an installation space 175 in a transverse direction. The installation space 175 is arranged eccentrically with respect to the vehicle center. In a downward direction, the installation space 175 is delimited by the tank top side 115 and the fastening wall 140. In a transverse direction, the fastening wall 140 is arranged between the vehicle side delimitation 165, 170 and the longitudinal member 155, 160. The pump device 85 and the attachment line 90 are arranged in the installation space 175.

The tank base 110 has a first tank base section 180 and, by way of example, at least one second tank base section 185. The second tank base section 185 is arranged below a lower end 190 of the tank side wall 120. Furthermore, the second tank base section 185 is situated at a lower level than the first tank base section 180. The second tank base section 185 and the first tank top side section 205 are, by way of example, arranged perpendicular to the tank side wall 120. Here, by way of example, the second tank base section 185 extends in an xy plane. The tank side wall 120 is connected by means of its lower end 190 to a first end 195 of the first tank base section 180. A second end 200, which is arranged offset inward and downward, of the first tank base section 180 is connected to the second tank base section 185. Furthermore, the second tank base section 185 is arranged laterally offset in a transverse direction with respect to the tank side wall 120. The fastening wall 140 is preferably arranged entirely above the first tank base section 180. Here, the first tank base section 180 runs obliquely with respect to the second tank base section 185 and with respect to the tank side wall 120. In this way, sufficient ground clearance is ensured at the sides on the vehicle 10.

Figure 5:
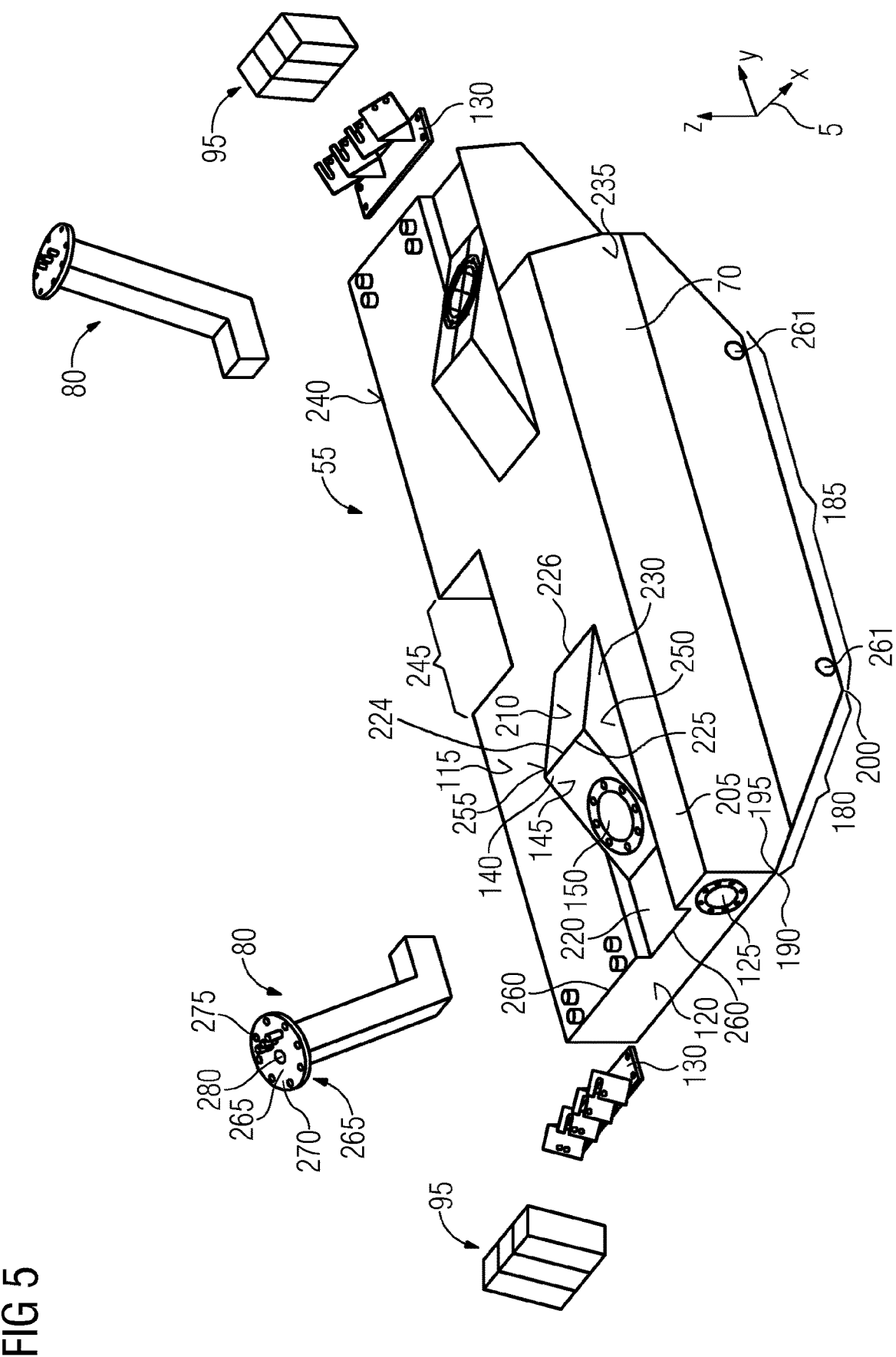
FIG. 5 is an exploded illustration of a tank system of the vehicle shown in FIGS. 1 and 2.

FIG. 5 is an exploded illustration of the tank system 55 shown in FIG. 4.

The tank top side 115 furthermore has a first tank top side section 205 and a second tank top side section 210. The first tank top side section 205 is of planar form and is arranged parallel to the second tank base section 185. The fastening wall 140 is arranged, at least in sections, above an upper end 260 of the tank side wall 120. It is furthermore additionally possible, as shown in FIG. 5, for a depression 220 to be provided in the tank top side 115 between the tank side wall 120 and the fastening wall 140, in order to ensure easy access to the fastening wall 140 and the extraction device 80 from the side of the vehicle. It is particularly advantageous if the depression 220 has the same longitudinal extent (x direction) as the fastening wall 140.

The second tank top side section 210 is arranged, on a rear side on a side facing toward the vehicle center, so as to adjoin the fastening wall 140. The second tank top side section 210 is connected by means of an upper end 224 to an upper end 225 of the fastening wall 140. The second tank top side section 210 is arranged so as to be obliquely inclined with respect to the first tank top side section 205. A lower end 226 of the second tank top side section 210 is connected to the first tank top side section 205. In a longitudinal direction, the second tank top side section 210 and the fastening wall 140 are adjoined by a front delimiting wall 250 and by a rear-side delimiting wall 255. The front and the rear-side delimiting walls 250, 255 are of planar form and extend, by way of example, in parallel, in each case in an xy plane. The delimiting walls 250, 255 are arranged perpendicular to the first tank top side section 205. The second tank top side section 210, the fastening wall 140 and the front and rear delimiting walls 250, 255 delimit the expansion volume 230, which is of prismatic form.

In an x direction, the tank 70 is delimited by a front tank wall 235 and a rear-side tank wall 240. The front and rear delimiting walls 250, 255 are, by way of example, arranged parallel to the front tank wall 235. The front tank wall 235 is of substantially planar form. The rear-side tank wall 240 is of planar form in sections, and has a recess 245 which extends toward the front tank wall 235.

The extraction device 80 comprises an attachment device 265. The attachment device 265 comprises a flange 270 and at least one third fastening means 275. The third fastening means 275 fastens the flange 270 at the outer side to the fastening wall 140. The third fastening means 275 may in this case have for example a screw and a thread arranged on the tank 70, wherein the screw extends through the tank 70 and presses the flange 270 against the fastening surface 145.

Furthermore, the extraction device 80 may have a fill level sensor 280. The fill level sensor 280 is fastened to the flange 270. The fill level sensor 280 is designed to detect a fill level of the exhaust-gas aftertreatment liquid 75 in the tank 70. The fill level sensor 280 may in this case comprise, for example, an ultrasound sensor element.

Figure 6:
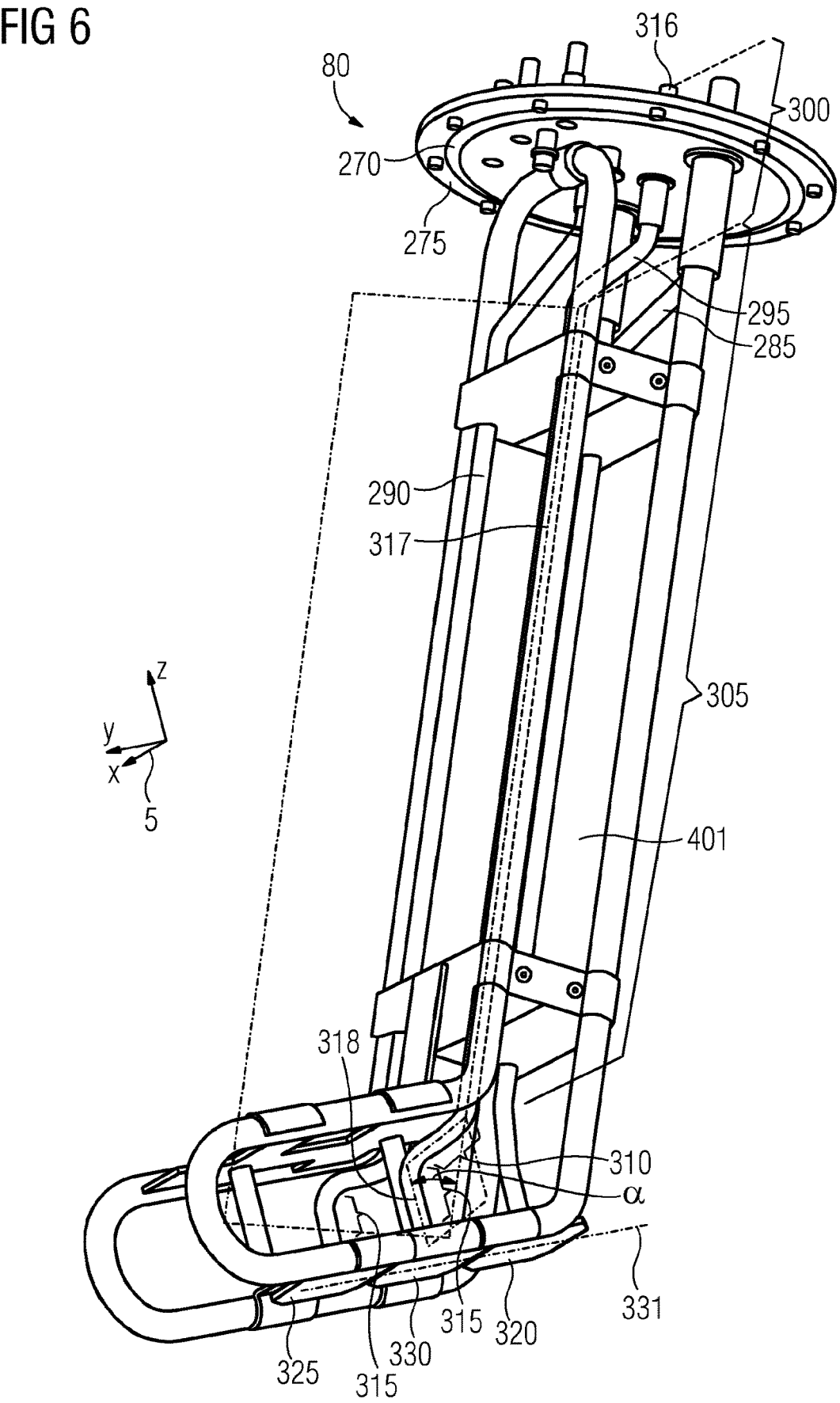
FIGS. 6 to 8 show various perspective views of an extraction device of the tank system.

FIG. 6 shows a perspective view, from a first position, of the extraction device 80. The extraction device 80 has, by way of example, a first extraction line 285, a second extraction line 290 and a third extraction line 295. The number of extraction lines 285, 290, 295 corresponds here to the number of pumps 135 which are fastened, on one side of the vehicle, to the holder 130. It is self-evidently also conceivable for the number of extraction lines 285, 290, 295 to differ from the number of pumps 135. It is also possible for the extraction device 80 to have a number of extraction lines 285, 290, 295 other than that shown in FIG. 6. In particular, it is also conceivable for only a single extraction line 285, 290, 295 to be provided.

The first extraction line 285 has an attachment section 300, a first connecting section 305, a second connecting section 310 and an extraction section 315. The attachment section 300 is led through the flange 270 and has an attachment element 316. The attachment line 90 is fastened to the attachment element 316. The attachment section 300 is connected, on a side averted from the attachment element 316, to the first connecting section 305. On a side averted from the attachment section 300, the first connecting section 305 is connected to the second connecting section 310. On a side of the second connecting section 310 which is averted from the first connecting section 305, the second connecting section 310 is connected to the extraction section 315. The second connecting section 310 is arranged between the first connecting section 305 and the extraction section 315 and connects the extraction section 315 to the first connecting section 305. The second connecting section 310 is obliquely inclined with respect to the extraction section 315 and obliquely inclined with respect to the first connecting section 305. The first connecting section 305 of the first extraction line 285 is in this case arranged so as to run perpendicular to the flange 270. Furthermore, the first connecting section 305 is arranged obliquely with respect to the extraction section 315 and with respect to the second tank base section 185. The extraction section 315 is arranged perpendicular to the second tank base section 185.

The first connecting section 305 is in this case arranged in a first plane 317. The extraction section 315 is arranged in a second plane 318. The first plane 317 is obliquely inclined with respect to the second plane 318. Here, the first plane 317 encloses with the second plane 318 a first angle α which has a value which lies in a range from 0° to 90°. The value preferably lies in a range between 0° and 45°. The second plane 318 is preferably arranged perpendicular to the second tank base section 185.

Furthermore, the extraction device 80 has a first filter device 320, a second filter device 325 and a third filter device 330. The filter device 320, 325, 330 is, by way of example, designed as an areal filter. The filter devices 320, 325, 330 are arranged in a row 331 in a yz plane. The first filter device 320 is, on a side of the extraction section 315 which is averted from the second connecting section 310, connected to the extraction section 315, and is arranged together with the extraction section 315 above the second tank base section 185. Furthermore, the filter devices 320, 325, 330 are arranged in a longitudinal direction between the first heating tube section 385 of the first heat exchanger element 355 and the first heating tube section 385 of the second heat exchanger element 360. The row 331 of filter devices 320, 325, 330 is arranged parallel to the first heating tube section 385.

The second extraction line 290 and the third extraction line 295 are designed similarly to the first extraction line 285 and have the same sections 300, 305, 310, 315. By contrast thereto, the attachment section 300 is designed differently to the first connecting section 305, in order to provide, on the flange 270, a respectively different position for the attachment of the attachment line 90. Likewise, the second connecting section 310 of the second extraction line 290 and the second connecting section 310 of the third extraction line 295 are inclined differently with respect to the first connecting section 305 of the respective (second and third) extraction line 290, 295, in order to thus ensure in each case an offset profile of the extraction section 315 and of the second extraction line 290 and of the third extraction line 295. The extraction lines 285, 290, 295 are in this case designed such that the attachment sections 300 of the respective extraction lines 285, 290, 295 are arranged in a row on the flange 270, wherein the row runs parallel to the x axis.

The second filter device 325 is in this case connected to the extraction section 315 of the second extraction line 290, and the third filter device 330 is connected to the extraction section 315 of the third extraction line 295. The extraction lines 285, 290, 295 have in common the fact that the first connecting section 305 runs so as to be obliquely inclined with respect to the respective extraction section 315 of the extraction line 285, 290, 295. Furthermore, the respective first connecting section 305 runs parallel to the first connecting section 305 of the other extraction line 290, 295.

It is pointed out that the embodiment of the extraction line 285, 290, 295 described in FIG. 6 may also differ. In particular, it is conceivable here for the second connecting section 310 to be dispensed with. It is also conceivable that, instead of the curved embodiment of the attachment section 300 shown in FIG. 6, the attachment section 300 is of rectilinear form, in particular as a continuation of the first connecting section 305.

Figure 7:
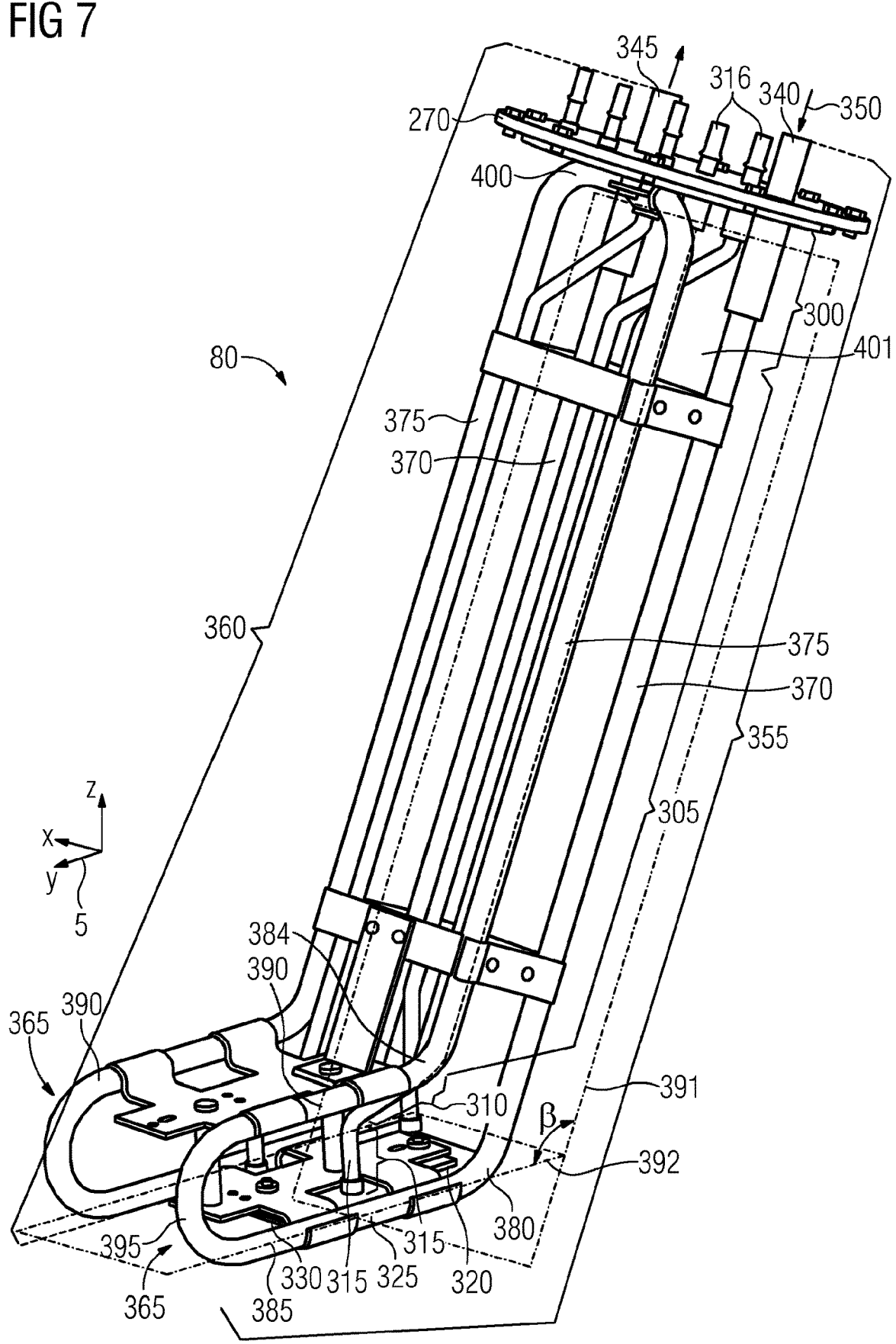

FIG. 7 shows a perspective view of the extraction device 80 from a second position. The extraction device 80 optionally additionally has a heat exchanger device 335.

The heat exchanger device 335 has an inlet 340 and a return 345. The inlet 340 is in this case connected to the cooling system 45 of the drive unit 15. Here, via the inlet 340, a heat carrier medium 350 of the cooling system 45 is conveyed to the heat exchanger device 335. Via the return 345, the cooled heat carrier medium 350 is conveyed back to the cooling system 45 of the drive unit 15. The heat exchanger device 335 has a first heat exchanger element 355 and, by way of example, a second heat exchanger element 360.

The first heat exchanger element 355 has a heating tube 365, a first connecting line 370 and a second connecting line 375. The first connecting line and the second connecting line 370, 375 of the first heat exchanger element 355 are arranged parallel to one another. Furthermore, the first connecting line 370 and the second connecting line 375 of the first heat exchanger element 355 are arranged so as to run parallel to the first connecting section 305 of the extraction line 285, 290, 295. The first connecting line 370 of the first heat exchanger element 355 is led through the flange 270 and is mechanically fastened by means of said flange. The first connecting line 370 of the first heat exchanger element 355 fluidically connects the inlet 340 to an inlet side 380 of the heating tube 365 of the first heat exchanger element 355. An outlet side 384 of the first heating tube 365 of the first heat exchanger element 355 is connected to the second connecting line 375 of the first heat exchanger element 355.

The heating tube 365 of the first heat exchanger element 355 has a first heating tube section 385, a second heating tube section 390 and a heating tube connecting section 395. The first heating tube section 385 is connected to the first connecting line 370. The first heating tube section 385 is connected via the heating tube connecting section 395 to the second heating tube section 390. The first heating tube section 385 and the second heating tube section 390 are in this case arranged offset with respect to one another one above the other in a z direction. Here, the first heating tube section 385 and the second heating tube section 390 are arranged above the second tank base section 185 and parallel to the second tank base section 185. Furthermore, the first heating tube section 385 and for example also the second heating tube section 390 are arranged perpendicular to the extraction section 315. The heating tube connecting section 395 is arranged on a side of the heating tube section 385, 390 which is averted from the connecting line 370, 375.

Here, the first heating tube section 385 is arranged below the second heating tube section 390. The heating tube connecting section 395 is, by way of example, of arcuate form. Furthermore, the first connecting line 370 of the first heat exchanger element 355 is arranged in a third plane 391 and the first heating tube section 385 of the first heat exchanger element 355 is arranged in a fourth plane 392, wherein the third plane 391 is arranged at a second angle β with respect to the fourth plane 392, wherein the second angle β has a value which lies in a range of greater than 90° and less than 180°.

The second heat exchanger element 360 is of identical design to the first heat exchanger element 355 and has the heating tube 365, the first connecting line 370 and the second connecting line 375. By contrast, instead of the inlet 340, the return 345 is arranged on the second heat exchanger element 360. The second heat exchanger element 360 is arranged offset with respect to the first heat exchanger element 355 in a longitudinal direction (x direction). The first connecting line 370 of the second heat exchanger element 360 is fluidically connected to the return 345. Furthermore, the second connecting line 375 of the first heat exchanger element 355 is fluidically connected via a third connecting line 400 of the heat exchanger device 335 to the second connecting line 375 of the second heat exchanger element 360. The third connecting line is arranged at the inside on the flange 270.

The first heat exchanger element 355 and the second heat exchanger element 360 delimit a protected region 401. The extraction lines 285, 290, 295 and the filter devices 320, 325, 330 are arranged in the protected region 401.

During the operation of the drive unit 15, the heat carrier medium 350 is introduced via the inlet 340 into the first heat exchanger element 355 and flows through the first connecting line 370 to the inlet side 380 of the heating tube 365 of the first heat exchanger element 355. After flowing through the heating tube 365 of the first heat exchanger element 355, the heat carrier medium 350 flows via the outlet side 384 of the heating tube 365 and via the second connecting line 375 upward in the direction of the flange 370. On a tank inner side, the heat carrier medium 350 is conducted through the third connecting line 400 to the first connecting line 370 of the second heat exchanger element 360. The second heat exchanger element 360 is flowed through by the heat carrier medium 350 in the opposite direction in relation to the flow of the heat carrier medium 350 through the first heat exchanger element 355. Here, the inlet side 380 of the heating tube 365 is exchanged for the outlet side 384 of the heating tube 365.

The second connecting line 375 conducts the heat carrier medium 350 to the heating tube 365 of the second heat exchanger element 360. From the heating tube 365, the heat carrier medium 350 is conducted via the first connecting line 370 to the return 345.

Figure 8:
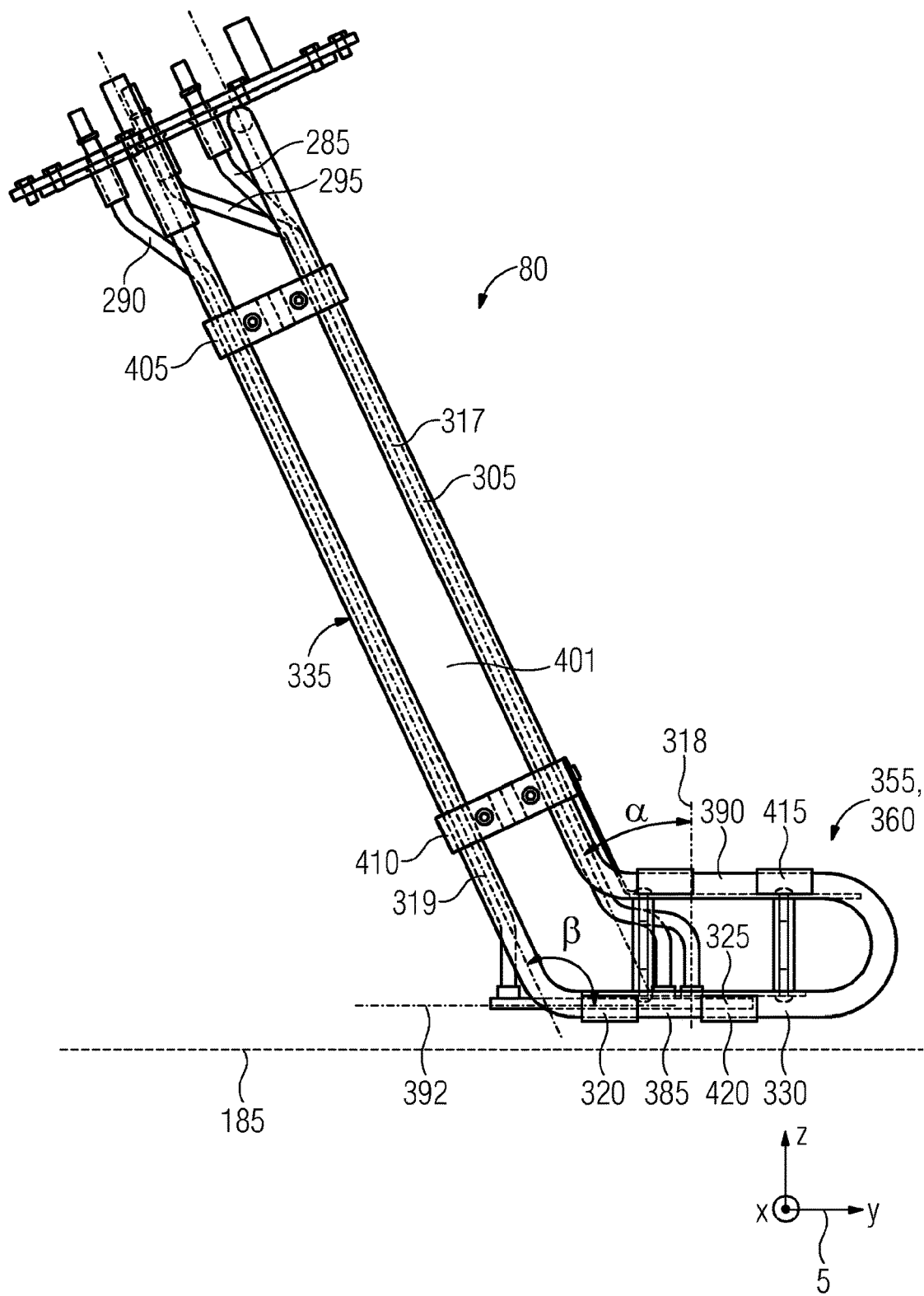

FIG. 8 shows a side view of the extraction device 80.

The extraction device 80 furthermore has a first connecting means 405 and, by way of example, a second connecting means 410. The first connecting means 405 and the second connecting means 410 are arranged offset in the direction of the first connecting section 305 of the extraction line 285, 290, 295. Here, the first and second connecting means 405, 410 connect the first heat exchanger element 355 to the second heat exchanger element 360 in the region of the first connecting line 370 and of the second connecting line 375. Furthermore, the first connecting sections 305 of the individual extraction lines 285, 290, 295 are connected to one another. This embodiment has the advantage that vibrations in the extraction lines 285, 290, 295 and in the heat exchanger device 335 are avoided.

Furthermore, a third connecting element 415 is provided. The third connecting element 415 is in this case of plate-like form and connects the second heating tube section 390 of the first heat exchanger element 355 to the second heating tube section 390 of the second heat exchanger element 360. Furthermore, by way of example, a fourth connecting element 420 may be provided. The fourth connecting means 420 is of plate-like form. The fourth connecting element 420 connects the first heating tube section 385 to the first heating tube section 385 of the second heat exchanger element 360. The filter device 320, 325, 330 is arranged below and between the second tank base section 210 and the fourth connecting means 420.

Figure 9:
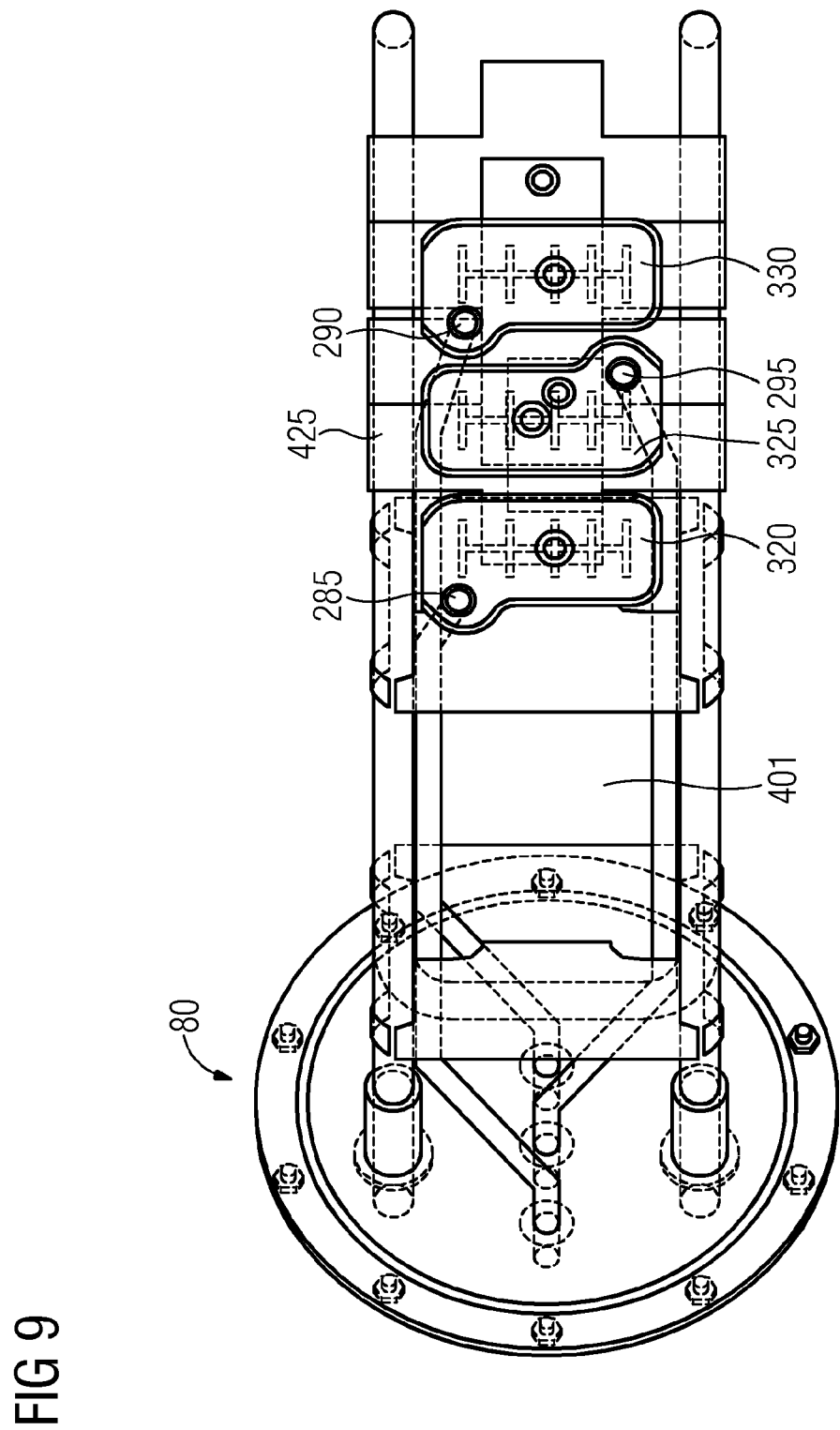
FIG. 9 shows a view from below of the extraction device.

FIG. 9 shows a view from below of the extraction device 80.

Furthermore, at the underside of the fourth connecting element 420, the filter device 320, 325, 330 is arranged between the second tank base section 185 and the fourth connecting element 420. In this way, a reliable complete extraction of the exhaust-gas aftertreatment liquid 75 from the tank 70 is ensured. Furthermore, the filter device 320, 325, 330 ensures that dirt particles are not conveyed out of the tank 70.

Figure 10:
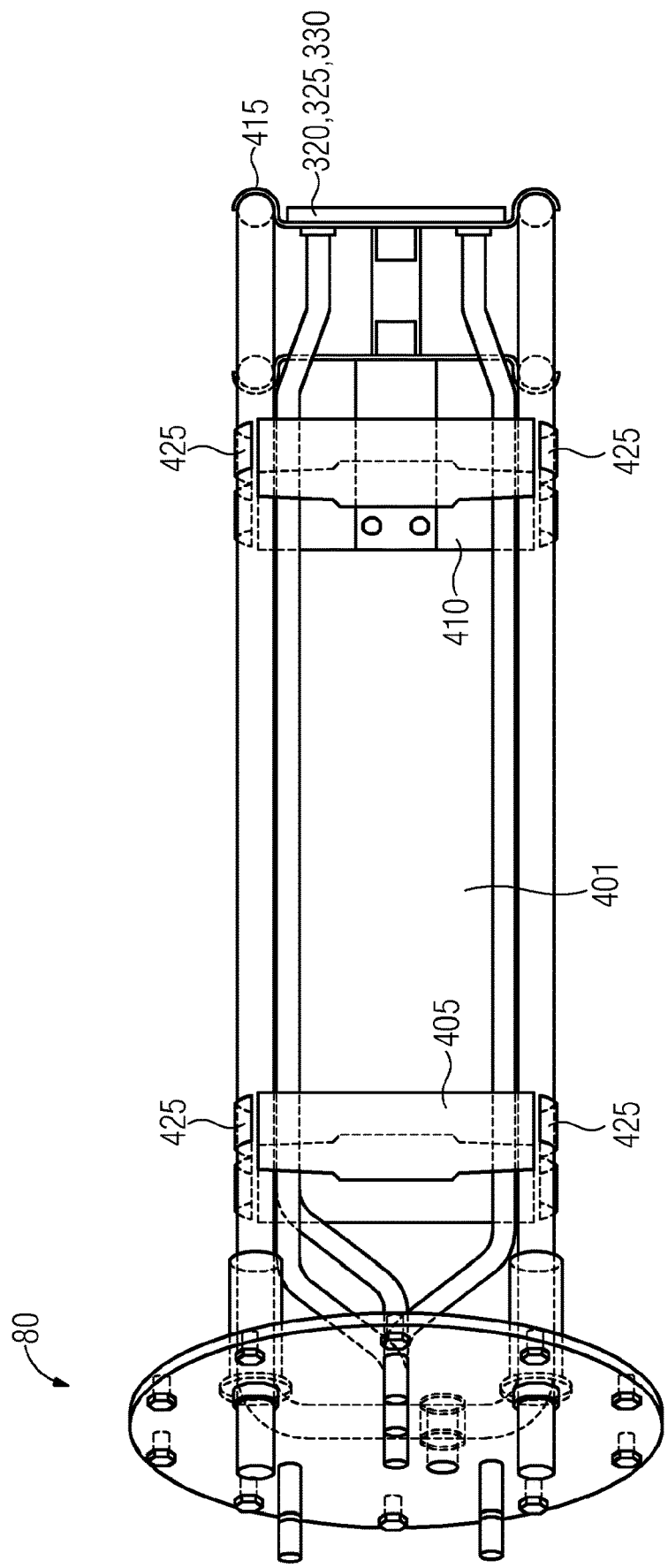
FIG. 10 shows a plan view of the extraction device.

FIG. 10 shows a plan view of the extraction device 80. The first connecting means 405 and the second connecting means 410 are in this case of block-like form and each have a clamping means 425 in order to reliably fix the heat exchanger elements 355, 360 and the extraction line 285, 290, 295 to one another.

The embodiment of the vehicle 10 having the tank system 55 as described in FIGS. 1 to 10 has the advantage that the extraction device 80 is inclined towards the vehicle side delimitation 165, 170 and, in this way, the extraction device 80 can be easily removed from the tank 70. Furthermore, by means of the above-described embodiment, it is ensured that, despite a laterally offset arrangement of the attachment device 265 on the tank 70 laterally outward in the direction of the vehicle wall 165, 170, a reliable extraction of the exhaust-gas purification liquid 75 from the lowest region of the tank 70 above the second tank base section 185 is ensured, and the storage volume 171 can be reliably substantially completely extracted from the tank 70 through the extraction device 80.

To clean the tank, the second fastening means 410 is released. Furthermore, the inlet 340 and the return 345 are decoupled from the cooling system 45. Furthermore, the attachment line 90 is decoupled from the attachment section 300 of the respective extraction line 285, 290, 295. Thereafter, the extraction device 80 is moved, with the attachment device 265 first, into the installation space 175. Here, the extraction device 80 is rotated if necessary. Subsequently, the extraction device is tilted about the x axis and the heating tube 365 is led through first between tank top side 115 and the vehicle side delimitation 165, 170. The installation of the extraction device 80 is performed in a reverse sequence.

The embodiment described in FIGS. 1 to 10 has the advantage that the tank 70 can be cleaned particularly easily through the tank opening 150. Furthermore, for this purpose, an outflow opening 261 may be provided on the tank 70, which outflow opening is arranged adjacent to the second tank base section 185 at the bottom. In this way, it is for example possible for a nozzle of an air-pressure cleaner to be led through the tank opening 150 in order to clean the tank 70 at the inner side. The cleaning agent that is used can thus be conducted out of the tank 70 via the outflow opening 261.

Owing to the facilitated uninstallation, and owing to the facilitated installation of the extraction device 80, maintenance of the filter device 320, 325, 330 can be performed particularly easily. In particular, a filter element of the filter device 320, 325, 330 can be particularly easily exchanged. Furthermore, owing to the increased number of extraction lines 285, 290, 295 per extraction device 80, a greater amount of exhaust-gas aftertreatment liquid 75 can be extracted from the tank 70. Furthermore, the protected region 401 prevents damage to the filter devices 320, 325, 330 and to the extraction lines 285, 290, 295. The connecting means 405, 410, 415, 420 support the extraction lines 285, 290, 295 and the heat exchanger device 335 and stiffen the extraction device 80, such that the latter are particularly well-protected against damage during the installation and/or uninstallation processes.

In this way, a number of extraction devices 80 that has to be provided for each tank 70 is smaller. In the embodiment, it is for example possible, for each side of the vehicle, for the number of extraction devices 80 to be reduced to in each case one extraction device 80. Furthermore, a situation is avoided in which the tank 70 itself has to be detached from the railcar body 30 in order to perform maintenance on the extraction device 80.

Owing to the lateral arrangement of the pump device 85 above the tank sidewall 120, maintenance on the respective pump 135 can likewise be performed particularly easily. In particular, if the pump 135 has a further filter, the filter of the pump 135 can be particularly easily exchanged.

The above-described vehicle 10 has, owing to the embodiment of the tank system 55, the advantage that the vehicle 10 can be operated at particularly low cost owing to the increased ease of maintenance.

Even though the invention has been illustrated and described in more detail on the basis of the preferred exemplary embodiment, the invention is not restricted by the disclosed examples and other variations may be derived therefrom by a person skilled in the art, without departing from the scope of protection of the invention.

The invention claimed is:

1. A tank system for a vehicle, the tank system comprising:
    a tank including a tank top side having a fastening wall and a first tank top side section, said fastening wall and said first tank top side section delimiting a top side of a tank interior space to be filled with an exhaust-gas aftertreatment liquid;
    said fastening wall being disposed obliquely relative to said first tank top side section and said fastening wall having a fastening surface and a tank opening;
    said tank including a tank base having a first tank base section and a second tank base section connected to said first tank base section, said second tank base section being disposed at a lower level than said first tank base section, said first tank base section being disposed obliquely relative to said second tank base section, and said second tank base section being disposed parallel to said first tank top side section;
    said fastening wall being disposed at least partly above said first tank base section; and
    an extraction device including an extraction line led through said tank opening and an attachment device fastened to said fastening surface, at least sections of said extraction line being disposed obliquely relative to said second tank base section, said extraction line extending below a majority of the first tank base section and above said second tank base section of said tank base and said extraction line being coupled to said attachment device, said extraction device being completely removable from said tank for maintenance by removing said attachment device and removing said extraction line through said tank opening.

2. The tank system according to claim 1, wherein said tank includes a tank side wall, and at least one of said fastening wall is obliquely inclined relative to said tank side wall or said tank side wall is perpendicular to said first tank top side section.

3. The tank system according to claim 2, wherein:
    said first tank base section has a first end and a second end;
    said tank side wall has a lower end connected to said first end of said first tank base section;
    said second tank base section is connected to said second end of said first tank base section;
    said second tank base section is disposed below said lower end of said tank side wall and laterally offset relative to said tank side wall; and
    said fastening wall is disposed above said first tank base section.

4. The tank system according to claim 3, wherein at least sections of said fastening wall project beyond said tank side wall, at least sections of said tank side wall delimit a storage volume of said tank, and said fastening wall delimits an expansion volume for the exhaust-gas aftertreatment liquid.

5. The tank system according to claim 2, wherein said tank top side has a depression formed therein between said fastening wall and said tank side wall, and said depression and said fastening wall have identical longitudinal extents.

6. A tank system for a vehicle, the tank system comprising:
    a tank including a tank top side having a fastening wall and a first tank top side section, said fastening wall and said first tank top side section delimiting a top side of a tank interior space to be filled with an exhaust-gas aftertreatment liquid;
    said fastening wall being disposed obliquely relative to said first tank top side section and said fastening wall having a fastening surface and a tank opening;
    said tank including a tank base having a first tank base section and a second tank base section connected to said first tank base section, said second tank base section being disposed at a lower level than said first tank base section, said first tank base section being disposed obliquely relative to said second tank base section, and said second tank base section being disposed parallel to said first tank top side section;
    said fastening wall being disposed at least partly above said first tank base section;
    an extraction device including an extraction line led through said tank opening and an attachment device fastened to said fastening surface, at least sections of said extraction line being disposed obliquely relative to said second tank base section, said extraction line extending above said second tank base section of said tank base and said extraction line being coupled to said attachment device;
    said tank top side having a second tank top side section with an upper end and a lower end;
    said fastening wall having a top side, at least sections of said top side projecting beyond said first tank top side section;
    said fastening wall having an upper end connected to said upper end of said second tank top side section;
    said lower end of said second tank top side section being connected to said first tank top side section;
    a front delimiting wall and a rear-side delimiting wall adjoining said second tank top side section and said fastening wall; and
    said front delimiting wall and said rear-side delimiting wall being mutually parallel and perpendicular to said first tank top side section.

7. A tank system for a vehicle, the tank system comprising:
    a tank including a tank top side having a fastening wall and a first tank top side section, said fastening wall and said first tank top side section delimiting a top side of a tank interior space to be filled with an exhaust-gas aftertreatment liquid;
    said fastening wall being disposed obliquely relative to said first tank top side section and said fastening wall having a fastening surface and a tank opening;

said tank including a tank base having a first tank base section and a second tank base section connected to said first tank base section, said second tank base section being disposed at a lower level than said first tank base section, said first tank base section being disposed obliquely relative to said second tank base section, and said second tank base section being disposed parallel to said first tank top side section;

said fastening wall being disposed at least partly above said first tank base section;

an extraction device including an extraction line led through said tank opening and an attachment device fastened to said fastening surface, at least sections of said extraction line being disposed obliquely relative to said second tank base section, said extraction line extending above said second tank base section of said tank base and said extraction line being coupled to said attachment device;

said extraction line being configured to conduct the exhaust-gas aftertreatment liquid;

said extraction line including a first connecting section coupled to said attachment device and an extraction section coupled to said first connecting section;

said first connecting section extending in a first plane and being obliquely inclined relative to said extraction section;

said extraction section extending in a second plane and being perpendicular to said first tank top side section;

said first plane being disposed obliquely relative to said second plane and said first and second planes enclosing a first angle having a value lying in a range of less than 90° and greater than 0°; and said extraction device including a filter device connected to said extraction section on a side of said extraction section facing away from said first connecting section.

8. The tank system according to claim 7, wherein said range is greater than 0° and at most 45°.

9. The tank system according to claim 7, wherein said range is from 15° to 30°.

10. The tank system according to claim 7, wherein said extraction line includes a second connecting section disposed between said first connecting section and said extraction section, said second connecting section connects said extraction section to said first connecting section, and said second connecting section is obliquely inclined relative to said extraction section and obliquely inclined relative to said first connecting section.

11. The tank system according to claim 7, which further comprises:
a heat exchanger device to be filled with a heat carrier medium, said heat exchanger device including a first heat exchanger element and a second heat exchanger element, said first heat exchanger element being offset relative to said second heat exchanger element;
each of said heat exchanger elements including a respective first connecting line, a respective second connecting line and a respective heating tube;
a third connecting line connecting said second connecting line of said first heat exchanger element to said second connecting line of said second heat exchanger element; and
said heat exchanger device delimiting a protected region between said first heat exchanger element and said second heat exchanger element, said extraction line being disposed in said protected region.

12. The tank system according to claim 11, wherein:
said first connecting line is coupled to said attachment device;
said first connecting line and said second connecting line are mutually parallel;
at least sections of said first connecting line and said second connecting line are parallel to said first connecting section of said extraction line;
said first connecting line is disposed in a third plane and said first heating tube section is disposed in a fourth plane;
said third and fourth planes enclose a second angle having a value lying in a range of greater than 90° and less than 180°; and
said heating tube includes at least one first heating tube section connected to said first connecting line and disposed perpendicular to said extraction section.

13. The tank system according to claim 12, wherein:
said heating tube includes a second heating tube section and a heating tube connecting section;
said second connecting line is connected to said heating tube,
at least sections of said second connecting line are parallel to said first connecting line; and
said heating tube connecting section fluidically connects said first heating tube section to said second heating tube section and is disposed on a side of said first heating tube section facing away from said first connecting line.

14. The tank system according to claim 11, wherein said filter device is disposed between said heating tube of said first heat exchanger element and said heating tube of said second heat exchanger element.

15. The tank system according to claim 14, wherein said filter device is an areal filter.

16. The tank system according to claim 11, wherein said filter device is one of multiple filter devices disposed in a row parallel to said heating tube.

17. A vehicle or diesel-electric rail vehicle, comprising:
an exhaust-gas aftertreatment system;
a tank system including:
a longitudinal member and a vehicle side delimitation;
a tank including a tank top side having a fastening wall and a first tank top side section, said fastening wall and said first tank top side section delimiting a top side of a tank interior space to be filled with an exhaust-gas aftertreatment liquid;
said fastening wall being disposed obliquely relative to said first tank top side section and said fastening wall having a fastening surface and a tank opening;
said tank including a tank base having a first tank base section and a second tank base section connected to said first tank base section, said second tank base section being disposed at a lower level than said first tank base section, said first tank base section being disposed obliquely relative to said second tank base section, and said second tank base section being disposed parallel to said first tank top side section;
said fastening wall being disposed at least partly above said first tank base section; and
an extraction device including an extraction line led through said tank opening and an attachment device fastened to said fastening surface, at least sections of said extraction line being disposed obliquely relative to said second tank base section, said extraction line extending above said second tank base section of said tank base and said extraction line being coupled to said attachment device;

said tank being disposed under said longitudinal member;

said vehicle side delimitation and said longitudinal member being mutually offset transversely to a direction of travel of the vehicle;

said vehicle side delimitation and said longitudinal member delimiting an installation space transversely relative to said direction of travel for at least one of installing or uninstalling said extraction device;

said installation space being downwardly delimited by said tank top side of said tank;

said tank system including at least one pump device and one attachment line disposed in said installation space; and said pump device having a suction side and a pressure side, said suction side being fluidically connected by said attachment line to said extraction device and said pressure side being fluidically connected to said exhaust-gas aftertreatment system.

18. The vehicle according to claim 17, wherein said attachment device is obliquely inclined toward said vehicle side delimitation, or said tank extends at least over 80 percent of a total vehicle width of the vehicle.

19. The vehicle according to claim 17, wherein said attachment device is obliquely inclined toward said vehicle side delimitation, and said tank extends at least over 80 percent of a total vehicle width of the vehicle.

* * * * *